March 17, 1959 C. R. TURNER 2,877,702
AUTOMATIC BREAD TOASTER
Filed June 6, 1955 4 Sheets-Sheet 2
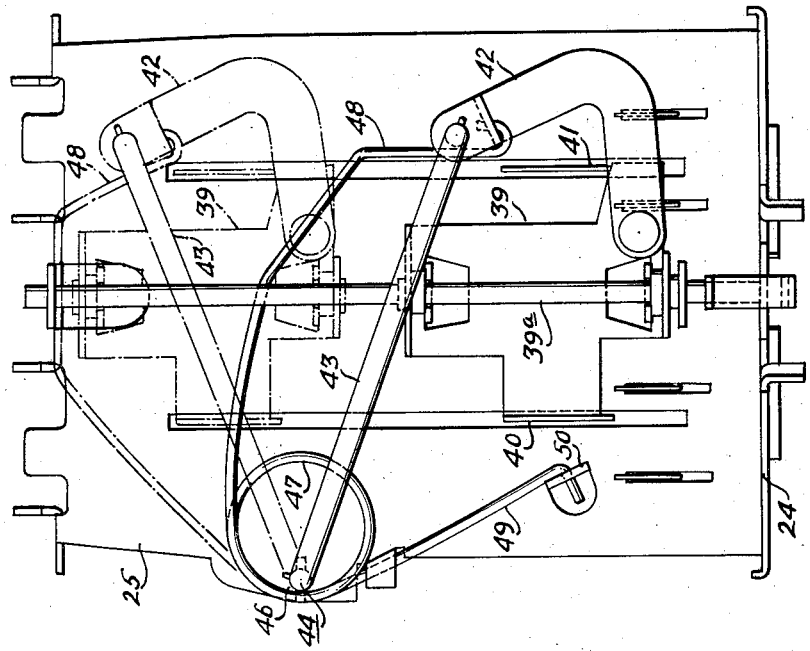
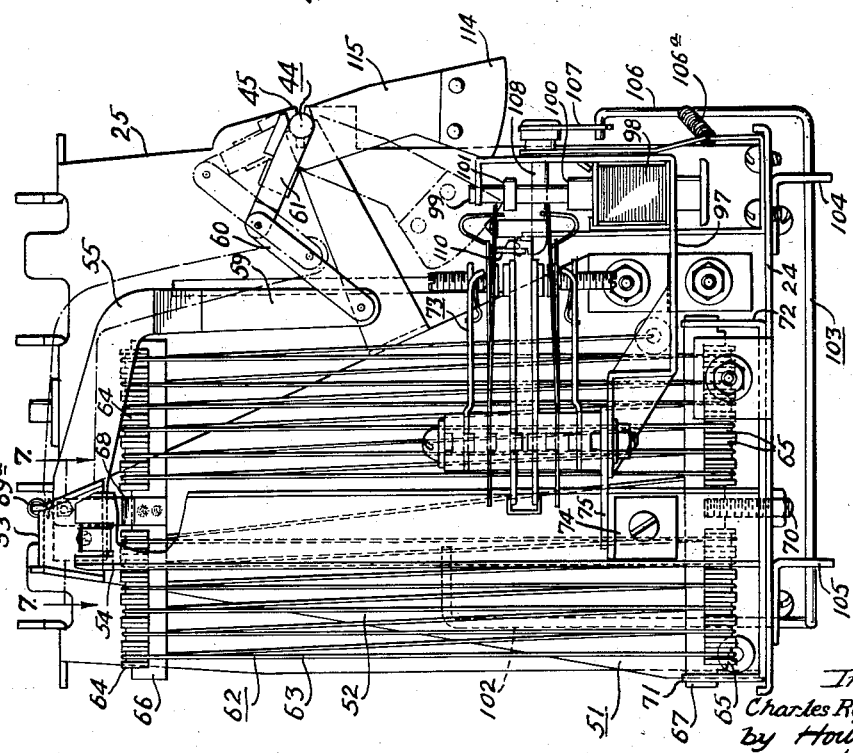
Inventor:
Charles Roger Turner
by Howson &
Howson
Attys.

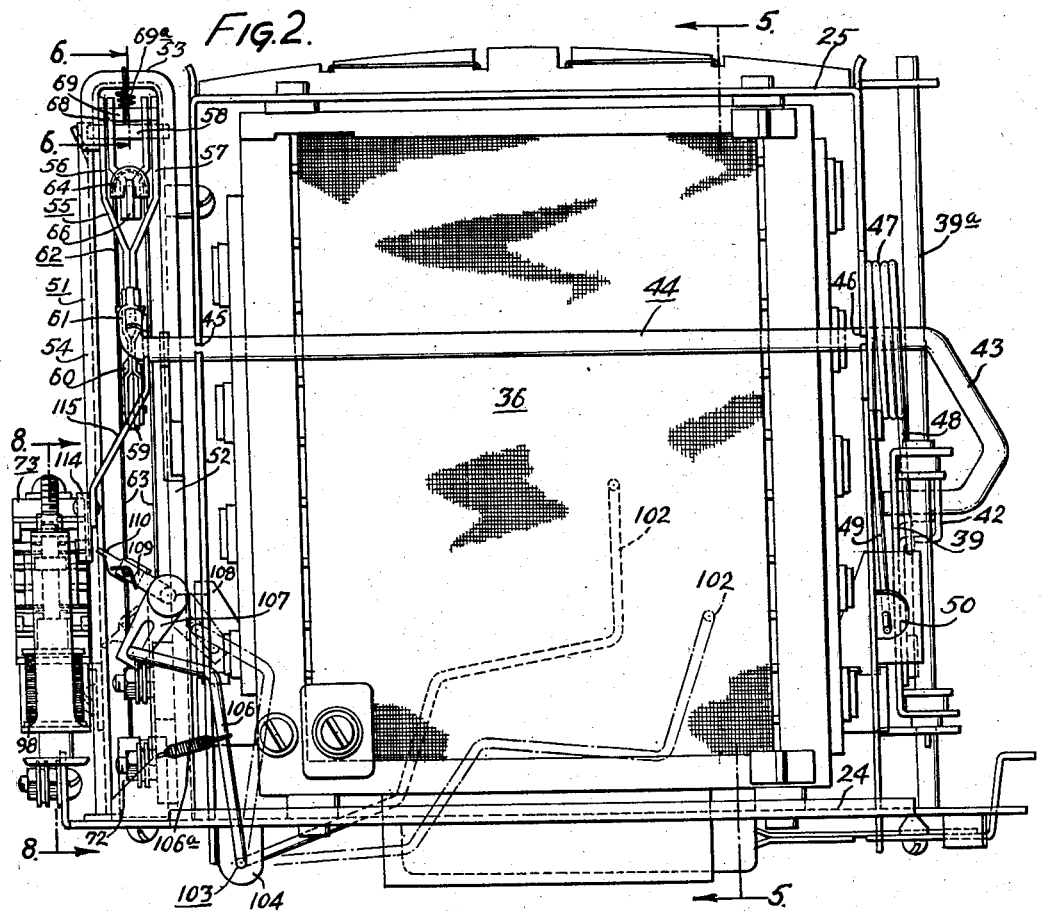

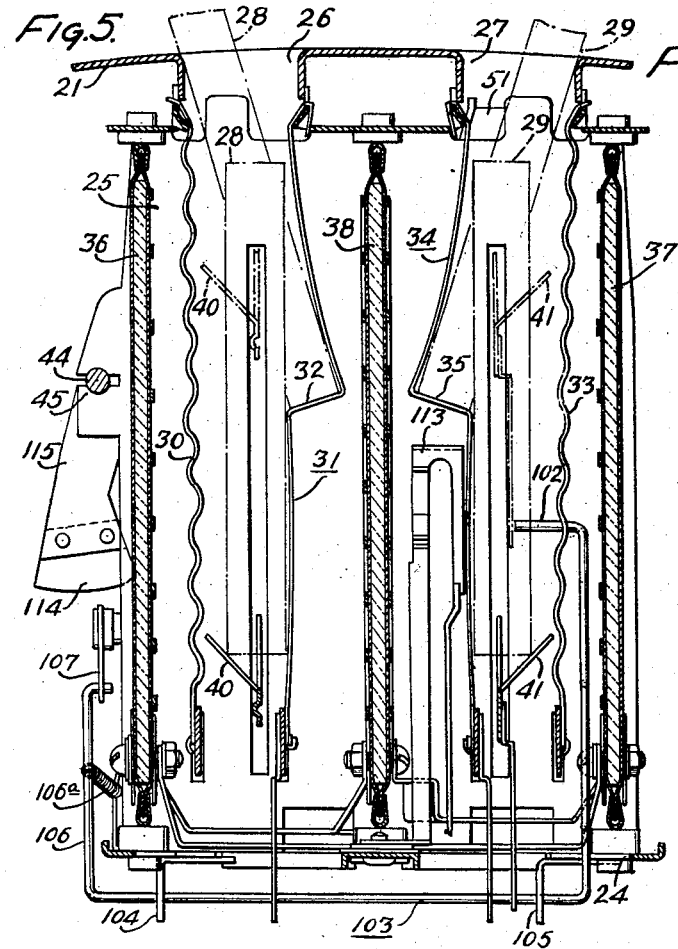

March 17, 1959   C. R. TURNER   2,877,702
AUTOMATIC BREAD TOASTER
Filed June 6, 1955   4 Sheets-Sheet 4
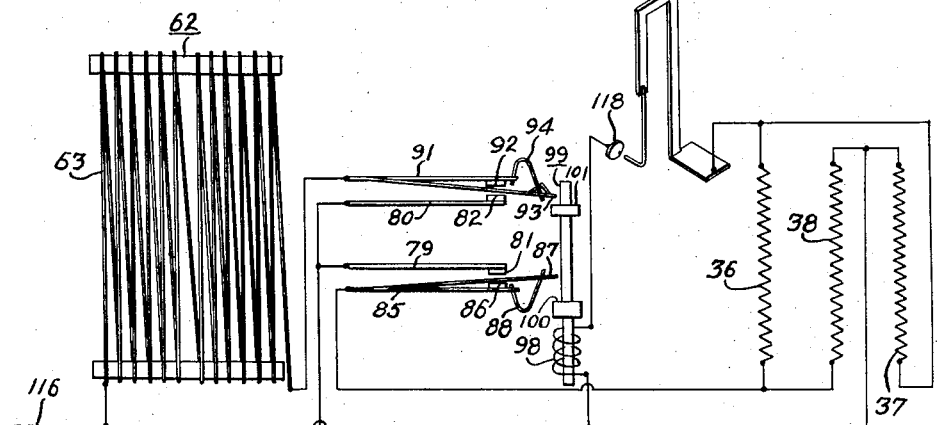
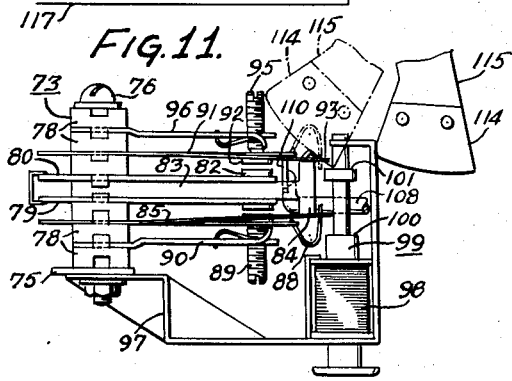
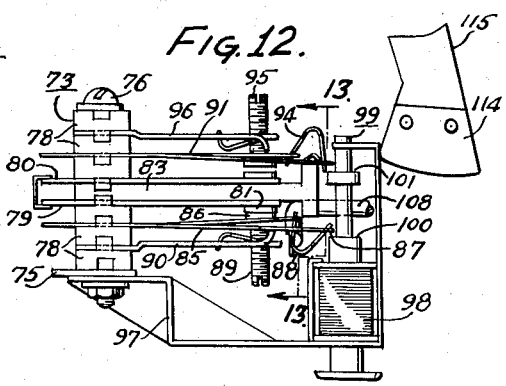
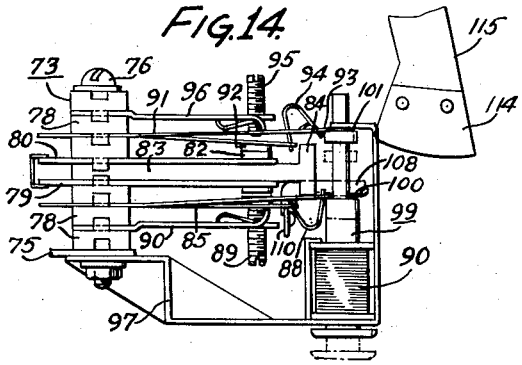
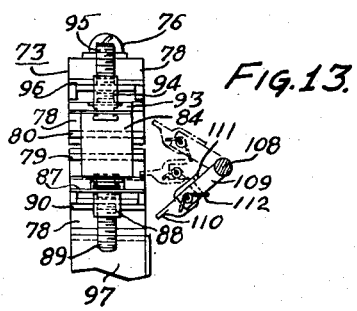
Inventor:
Charles Roger Turner
by Howson & Howson
Attys.

United States Patent Office 2,877,702
Patented Mar. 17, 1959

2,877,702

AUTOMATIC BREAD TOASTER

Charles Roger Turner, Springfield Township, Montgomery County, Pa., assignor to Proctor Electric Company, Philadelphia, Pa., a corporation of Pennsylvania Application June 6, 1955, Serial No. 513,439

13 Claims. (Cl. 99—329)

This invention relates to automatic bread toasters, and more particularly to toasters of the fully automatic type which operate through a complete toasting cycle in response to the mere insertion of a bread slice.

Various constructions and specific modes of operation have been proposed heretofore for fully automatic toasters, but generally speaking they have been relatively complex and expensive to manufacture.

The principal object of the present invention is to provide a fully automatic toaster which is relatively simple in construction and operation, and which can be manufactured at a reasonable cost.

Another object of the invention is to provide a fully automatic toaster comprising component parts and devices which are reliable in operation.

A toaster according to the present invention is principally characterized in that the bread supporting and moving means is disposed in bread toasting position prior to commencement of the toasting operation which commences in response to insertion of a bread slice, and at the end of the toasting operation, the bread-supporting means is moved to a bread-removing position where the bread slice is retained, and said supporting means is returned to the toasting position to be ready for the next operation. In the preferred form of the toaster, as hereinafter described, the movable bread-supporting means is actuated through the cooperative actions of a spring and a thermal motor, and the latter is under joint control of a bread-sensitive thermostat and the operating mechanism for the bread-supporting means.

The invention may be fully understood from the following detailed description with reference to the accompanying drawings, wherein Fig. 1 is a small-scale perspective view of a toaster embodying the present invention;

Fig. 2 is a side view of the toaster structure with the outer casing removed;

Figs. 3 and 4 are end views of the same taken from the opposite ends;

Fig. 5 is a cross-sectional view taken along line 5—5 of Fig. 2;

Fig. 6 is a detail sectional view taken along line 6—6 of Fig. 2;

Fig. 7 is a detail sectional view taken on line 7—7 of Fig. 3;

Fig. 8 is a detail sectional view taken along line 8—8 of Fig. 7;

Fig. 9 is a sectional view of the switch mechanism employed, taken along line 9—9 of Fig. 2;

Fig. 10 illustrates the electrical system employed in the toaster;

Fig. 11 is a side view of the switch mechanism prior to commencement of a toasting operation;

Fig. 12 is a similar view after commencement of the toasting operation;

Fig. 13 is a sectional view taken along line 13—13 of Fig. 12, showing more clearly the manner in which a toasting operation is initiated; and Fig. 14 is a side view of the switch mechanism at the end of the toasting operation.

Referring first to Figs. 1 to 5, in Fig. 1 there is shown a toaster 20 of the two-well type, having an outer casing 21 and end members 22 and 23 which are formed of heat insulating material and which serve both as supporting feet and as carrying handles. Figs. 2 to 5 show the toaster structure which is enclosed by the casing 21. This structure comprises a base or chassis 24 and a frame 25 supported by the chassis. The frame provides the two bread wells 26 and 27 (Fig. 5) within which bread slices 28 and 29 may be inserted. Bread well 26 is defined by outer grille wires 30 and inner grille wires 31, the latter being shaped as shown to provide a shelf portion 32 onto which the bread slice is deposited at the end of the toasting operation as hereinafter described. The other bread well 27 is similarly defined by outer grille wires 33 and inner grille wires 34, the latter having a shelf portion 35. The heating elements comprise the two outer heating elements 36 and 37, and the inner heating element 38. These elements are preferably of the character disclosed and claimed in the copending application of J. J. Lawser, Serial No. 379,649, filed September 11, 1953, now Patent 2,747,072.

A bread carriage 39, slidably supported by vertical post 39a (see Figs. 4 and 5), has bread-supporting racks 40 and 41 within the two bread wells for movably supporting the bread slices. The carriage is connected through link 42 (Fig. 4) to a lever 43 which forms one arm of a rod 44. As shown in Fig. 2, rod 44 extends along one side of the toaster structure, and it is rotatably supported by the toaster frame at 45 and 46. The bread carriage is urged upwardly by a spring 47 (see Fig. 4) which encircles rod 44 and has extending arms 48 and 49 connected respectively to link 42 and to a stationary lug 50. Except at the time of termination of each toasting operation as hereinafter described, the bread carriage is held in its lowermost or toasting position, against the action of spring 47, by current-operable means now to be described.

Referring to Figs. 2 and 3, at the end of the toaster structure shown in Fig. 3, there is a rigid supporting arbor or frame 51 which is mounted on the base or chassis 24. The arbor 51 comprises a generally triangular plate 52 having an inverted U-shaped extension 53 at its apex, and a relatively narrow plate or bar 54 secured to portion 53 and disposed in spaced relation to plate 52. Pivotally mounted to the upper portion of the arbor 51 is a lever 55. As shown in Figs. 2 and 7, this lever has spaced arms 56 and 57 which extend within the top 53 of the arbor and are fulcrumed on a transverse knife-edge shaped pin 58 supported by portion 53. As shown in Fig. 3, lever 55 has downward extension 59 which is pivotally connected to a link 60, which in turn is pivotally connected to an arm 61 of rod 44. A thermal motor, designated generally by reference numeral 62, functions through lever 55, link 60 and rod 44 to effect upward and downward movement of the bread carriage 39 at the end of each toasting operation.

Referring particularly to Fig. 3, the thermal motor 62 comprises a current-conductive expansible and contractable wire 63 which extends in vertical runs between upper and lower insulators 64 and 65 mounted respectively upon upper and lower bars 66 and 67. The upper bar 66 is connected to a link 68, which in turn is connected to a second knife-edge shaped pin 69 whose ends are disposed in relatively large apertures of arms 56 and 57 (see Figs. 6 to 8). A tension spring 69a is connected between pin 69 and the upper portion 53 of arbor 51. Normally the downward pull of wire 63 overcomes the tension of spring 69a, but when wire 63 expands any slack therein will be taken up by spring 69a, thus preventing shorting of the wire against nearby parts. The lower bar 67 is secured to a screw 70 which threadedly engages the base 24. This screw permits bar 67 to be adjusted. The ends of bar 67 are slidably retained in slotted guides 71 and 72 which extend upwardly from the base 24.

The toaster heating elements and the thermal motor 62 are controlled by the switch mechanism designated generally by reference numeral 73, which mechanism is best shown in Fig. 9. Referring particularly to Fig. 9, an angle bracket 74 is secured to the vertical plate or bar 54, and a supporting arm 75 is secured to and extends from the bracket 74. The switch mechanism 73 is mounted on arm 75 by means of a bolt 76. Surrounding the bolt 76 are insulating spacers 78. The post-like assembly thus provided serves to support the elements of two switches now to be described.

Extending from the central portion of the support assembly are two rigid conductive arms 79 and 80 which carry contacts 81 and 82. An insulating member 83 is disposed between the arms 79 and 80 and extends therebeyond, terminating in a vertical portion 84 whose purpose will be understood presently. Below the rigid arm 79 is a conductive spring member 85 which comprises a central element carrying a contact 86 and an outer U-shaped element 87 which extends lengthwise beyond the first element and is interconnected therewith by a U-shaped spring 88. There is thus provided an over-center arrangement for actuation of contact 86 in response to vertical movement of element 87. Thus, downward movement of element 87 causes closure of contacts 81 and 86, and upward movement of element 87 causes opening of the contacts. An adjustable screw 89, supported by rigid arm 90, serves as a stop to establish the open position of the movable contact 86.

Above the rigid arm 80 is a similar over-center arrangement. A conductive spring member 91 comprises a first element carrying a contact 92 and a second element 93 which is interconnected with the first element by a spring 94. Upward movement of element 93 causes closure of contacts 82 and 92, while downward movement of element 93 causes opening of the contacts. An adjustable screw 95, carried by rigid arm 96, establishes the open position of contact 92. The vertical end portion 84 of insulating member 83 serves as a stop for both actuating elements of the two switches.

The bolt 79, which mounts the above-described switch assembly, also serves to hold a bracket 97 which supports a solenoid 98. The solenoid plunger or armature 99 has a shoulder 100 thereon for engagement with element 87, and the plunger also has a shoulder 101 for engagement with element 93. The actuation of the switches by the solenoid will be understood from the later description of the operation.

Initiation of a toasting operation is effected by closure of switch contacts 81 and 86. Referring particularly to Figs. 2 and 5, the initiation of a toasting operation is effected, in response to insertion of a bread slice in bread well 27, through downward actuation of arm 102 forming part of rod 103 which is rotatably supported by bearing supports 104 and 105. A second arm 106, forming part of rod 103, is engaged with a slotted arm 107 mounted on a shaft 108 which is rotatably supported by the frame 25. A spring 106a exerts a pulling force on arm 106 to bias arm 102 upwardly. Extending from the rotatable shaft 108 is an arm 109 (see Fig. 13) which pivotally carries a finger 110 having a stop portion 111 engaging arm 109. Spring 112 normally maintains finger 110 in the position shown, but the finger is deflectable in one direction relative to arm 109 during operation as hereinafter described.

The energization of the expandable and contractable wire 63 is controlled by switch contacts 82 and 92. These contacts are closed by the solenoid 98 which is under control of the thermostat 113. The latter may be of the character disclosed and claimed in U. S. Patent 2,667,115, issued January 26, 1954, to Vogelsberg, and is preferably of the improved type disclosed and claimed in the copending application of J. J. Lawser, Serial No. 479,004, filed December 31, 1954. In the preferred form of the toaster, as illustrated, the thermostat is disposed behind the grille wire 34 (see Fig. 5) below the shelf portion 35. The thermostat responds to the surface temperature of the bread slice in well 27, and when the desired degree of toasting has been reached, as determined by the color adjustment, the thermostat energizes solenoid 98 to close the contacts 82 and 92. The consequent energization of wire 63 causes expansion thereof and relaxes the downward force on the bread carriage. This permits the carriage to be raised by spring 47, and when the carriage reaches its upper bread-removing position, the contacts 82 and 92 are opened by a cam 114 (see Fig. 3) carried by an arm 115 which is mounted on rod 44.

Fig. 10 shows the electrical system of the toaster. The toaster heating elements 36, 37 and 38 are connected to the supply conductors 116 and 117 through the switch comprising contacts 81 and 86. The expandable and contractable wire 63 is connected to the supply conductors through the switch comprising contacts 82 and 92. The coil of solenoid 98 is included in a circuit branch, at reduced voltage, with the thermostat 113 and the switch contact 118.

Considering now a complete toasting operation, prior to commencement of the operation, the switches are open, as shown in Figs. 3, 9, 10 and 11, and the bread carriage is held in its lower or toasting position by the contracted wire 63. The toasting operation is initiated by dropping a bread slice into well 27 onto the bread rack 41. Of course, usually two bread slices will be toasted at one time, and bread slices will usually be dropped into both of the bread wells. As may be seen in Fig. 5, the shelf portions 32 and 35 are located so as not to interfere with the dropping of the bread slices. When a bread slice is dropped into well 27, it strikes arm 102 and causes actuation of finger 110 counterclockwise as seen in Figs. 2 and 13, which finger engages switch element 87 and causes closure of contacts 81 and 86 (Fig. 12). This energizes the toaster heating elements (see Fig. 10) and the toasting operation commences and proceeds until the thermostat 113 effects closure of the solenoid branch circuit at contact 118. The consequent energization of solenoid 98 (see Fig. 14) causes the plunger 99 to move upward and shoulder 100 opens contacts 81 and 86 to deenergize the heating elements and the solenoid, while shoulder 101 closes contacts 82 and 92. The latter contacts energize wire 63 (see Fig. 10) which quickly heats and expands, permitting the bread carriage to be raised by spring 47. When the bread racks 40 and 41 reach their upper positions, the bread slices are deposited on the shelf portions 32 and 35 of grille wires 31 and 34, as shown in Fig. 5. This is due to the fact that the racks 40 and 41 are sloped to exert inward force on the lower portions of the bread slices onto the shelf portions.

The raising of bread slice 29 permits the spring biased rod 103 to return to its normal position, and consequently finger 110 (Fig. 13) returns to its raised position. In doing so it engages element 87 but is merely deflected thereby sufficiently to permit passage of the finger.

During the raising of the bread carriage by rotary movement of rod 44, cam 114 (Fig. 11) is actuated. As the bread carriage reaches the bread-removing position, cam 114 actuates switch element 93 to open contacts 82 and 92, thus deenergizing wire 63. The wire rapidly cools and contracts, and in doing so it exerts downward force on the bread carriage, storing the lifting energy in the spring 47 and returning the carriage to the toasting position. The toaster is then in condition for the next toasting operation.

The preferred embodiment of the invention, as illustrated and described, has certain additional advantages or features as follows.

The thermal motor, the switch mechanism and the solenoid are all located at one end of the toaster where the supply conductor cord is brought into the toaster. This greatly simplifies the connections.

In operation, deenergization of the heating elements takes place prior to energization of the thermal motor. This is due to the fact that shoulder 100 opens contacts 81 and 86 just prior to the closing of contacts 82 and 92 by shoulder 101. This permits use of high wattage in the thermal motor without exceeding the wattage rating of the toaster, e. g. 1200 to 1400 watts. High current in the thermal motor provides quick heating and consequent quick raising of the bread carriage.

The rigid and strong supporting arbor 51 takes the high forces of the thermal motor and associated lever system. Moreover the elements associated with the arbor are in double shear, each pin being supported at both ends, and each element connected to the pins being a double element engaging the pin at spaced points.

While a preferred embodiment of the invention has been illustrated and described, it will be apparent that various modifications may be made and other embodiments may be employed within the scope of the invention. It will be understood, therefore, that the invention contemplates all such modifications and embodiments as come within the scope of the appended claims.

I claim:

1. In an automatic bread toaster having at least one bread-receiving well, bread carriage means within said well movable between a toasting position at the lower part of said well and a higher bread-removing position, spring means urging said carriage means upward toward said bread-removing position, normally-deenergized current-operable means for exerting downward force on said carriage means greater than the force of said spring means and adapted when energized to relax the downward force, means operable by a bread slice inserted in said well to initiate a toasting operation, means operable at the end of the toasting operation to energize said current-operable means thereby to effect movement of said carriage means by said spring means to said bread-removing position, means for retaining the bread slice in said bread-removing position, and means for deenergizing said current-operable means to cause return movement of said carriage means thereby to said toasting position.

2. In an automatic bread toaster having at least one bread-receiving well, electric heating means disposed on opposite sides of said well, bread carriage means within said well movable between a toasting position at the lower part of said well and a higher bread-removing position, spring means urging said carriage means upward toward said bread-removing position, normally-deenergized current-operable means for exerting downward force on said carriage means greater than the force of said spring means and adapted when energized to relax the downward force, means operable by a bread slice inserted in said well to energize said heating means and thus initiate a toasting operation, means operable at the end of the toasting operation to deenergize said heating means and to energize said current-operable means, whereby the latter permits movement of said carriage means by said spring means to said bread-removing position, means for retaining the bread slice in said bread-removing position, and means for deenergizing said current-operable means to cause return movement of said carriage means thereby to said toasting position.

3. In an automatic bread toaster having at least one bread-receiving well, electric heating means disposed on opposite sides of said well, bread carriage means within said well movable between a toasting position at the lower part of said well and a higher bread-removing position, spring means urging said carriage means upward toward said bread-removing position, normally-deenergized current-operable means for exerting downward force on said carriage means greater than the force of said spring means and adapted when energized to relax the downward force, a first switch means for controlling energization of said heating means, a second switch means for controlling energization of said current-operable means, means operable by a bread slice inserted in said well for actuating said first switch means to energize said heating means and thus initiate a toasting operation, means operable at the end of the toasting operation for actuating both of said switch means to deenergize said heating means and to energize said current-operable means, whereby the latter permits movement of said carriage means by said spring means to said bread-removing position, means for retaining the bread slice in said bread-removing position, and means for actuating said second switch means to deenergize said current-operable means to cause return movement of said carriage means thereby to said toasting position.

4. In an automatic bread toaster having at least one bread-receiving well, bread carriage means within said well movable between a toasting position at the lower part of said well and a higher bread-removing position, operating mechanism for said carriage means, spring means connected to said mechanism to urge said carriage means upward toward said bread-removing position, normally-deenergized current-operable means for exerting through said mechanism a downward force on said carriage means greater than the force of said spring means and adapted when energized to relax the downward force, means operable by a bread slice inserted in said well to initiate a toasting operation, means operable at the end of the toasting operation, to energize said current-operable means thereby to effect movement of said carriage means by said spring means to said bread-removing position, means for retaining the bread slice in said bread-removing position, and means operable by said mechanism for deenergizing said current-operable means to cause return movement of said carriage means thereby to said toasting position.

5. In an automatic bread toaster having at least one bread-receiving well, electric heating means disposed on opposite sides of said well, bread carriage means within said well movable between a toasting position at the lower part of said well and a higher bread-removing position, operating mechanism for said carriage means, spring means connected to said mechanism to urge said carriage means upward toward said bread-removing position, normally-deenergized current-operable means for exerting through said mechanism a downward force on said carriage means greater than the force of said spring means and adapted when energized to relax the downward force, a first switch means for controlling energization of said heating means, a second switch means for controlling energization of said current-operable means, means operable by a bread slice inserted in said well for actuating said first switch means to energize said heating means and thus initiate a toasting operation, means operable at the end of the toasting operation for actuating both of said switch means to deenergize said heating means and to energize said current-operable means, whereby the latter permits movement of said carriage means by said spring means to said bread-removing position means for retaining the bread slice in said bread-removing position, and means operable by said mechanism for actuating said second switch means to deenergize said current-operable means to cause return movement of said carriage means thereby to said toasting position.

6. In an automatic bread toaster having at least one bread-receiving well, bread carriage means within said well movable between a toasting position at the lower part of said well and a higher bread-removing position, spring means urging said carriage means upward toward said bread-removing position, a normally-deenergized current-conductive expansible and contractable wire arranged to exert downward force on said carriage means greater than the force of said spring means and adapted when energized to relax the downward force, means operable by a bread slice inserted in said well to initiate a toasting operation, means operable at the end of the toasting operation to energize said wire thereby to effect movement of said carriage means by said spring means to said bread-removing position, means for retaining the bread slice in said bread-removing position, and means for deenergizing said wire to cause return movement of said carriage means thereby to said toasting position.

7. In an automatic bread toaster having at least one bread-receiving well, electric heating means disposed on opposite sides of said well, bread carriage means within said well movable between a toasting position at the lower part of said well and a higher bread-removing position, spring means urging said carriage means upward toward said bread-removing position, a normally-deenergized current-conductive expansible and contractable wire arranged to exert downward force on said carriage means greater than the force of said spring means and adapted when energized to relax the downward force, a first switch means for controlling energization of said heating means, a second switch means for controlling energization of said wire, means operable by a bread slice inserted in said well for actuating said first switch means to energize said heating means and thus initiate a toasting operation, means operable at the end of the toasting operation for actuating both of said switch means to deenergize said heating means and to energize said wire, whereby the latter permits movement of said carriage means by said spring means to said bread-removing position, means for retaining the bread slice in said bread-removing position, and means for actuating said second switch means to deenergize said wire to cause return movement of said carriage means thereby to said toasting position.

8. In an automatic bread toaster having at least one bread-receiving well, electric heating means disposed on opposite sides of said well, bread carriage means within said well movable between a toasting position at the lower part of said well and a higher bread-removing position, operating mechanism for said carriage means, spring means connected to said mechanism to urge said carriage means upward toward said bread-removing position, a normally-deenergized current-conductive expansible and contractable wire arranged to exert through said mechanism a downward force on said carriage means greater than the force of said spring means and adapted when energized to relax the downward force, a first switch means for controlling energization of said heating means, a second switch means for controlling energization of said wire, means operable by a bread slice inserted in said well for actuating said first switch means to energize said heating means and thus initiate a toasting operation, means operable at the end of the toasting operation for actuating both of said switch means to deenergize said heating means and to energize said wire, whereby the latter permits movement of said carriage means by said spring means to said bread-removing position, means for retaining the bread slice in said bread-removing position, and means operable by said mechanism for actuating said second switch means to deenergize said wire to cause return movement of said carriage means thereby to said toasting position.

9. An automatic bread toaster according to claim 8, wherein said bread well is defined by grille wires, and the grille wires on one side of the well are shaped to provide a shelf portion onto which the bread slice is deposited in the bread-removal position, and the means for actuating said switches at the end of the toasting operation includes a bread sensitive thermostat disposed behind said shaped grille wires below said shelf portion.

10. In an automatic bread toaster having at least one bread receiving well, electric heating means disposed on opposite sides of said well, a bread carriage within said well movable between a toasting position and a bread-removing position, means for holding said bread carriage in toasting position prior to the toasting operation, means operable by an inserted bread slice for energizing said heating means, thermostatically controlled means for deenergizing said heating means to terminate the toasting operation, means to thereafter effect movement of said bread carriage to said bread removing position, means for retaining said bread slice in the bread removing position and means for returning said bread carriage to said toasting position while said bread slice is retained in the bread-removing position.

11. An automatic bread toaster in accordance with claim 10 wherein the means for retaining said bread slice comprises a stationary shelf on which the bread slice is deposited by said bread carriage.

12. In an automatic bread toaster having at least one bread-receiving well defined by grille wires, the grille wires on one side of said well being shaped to provide a shelf portion, electric heating means disposed on opposite sides of said well, a bread carriage within said well movable between a toasting position at the lower part of said well and a higher bread-removing position, means for holding said bread carriage in toasting position prior to the toasting operation, means for energizing said heating means, thermostatically controlled means for deenergizing said heating means to terminate the toasting operation, automatic means to thereafter effect movement of said bread carriage to said bread removing position and to deposit the bread slice on said shelf portion, and automatic means to return said bread carriage to said toasting position while the bread slice is retained on said shelf portion.

13. In an automatic bread toaster having at least one bread-receiving well, electric heating means disposed on opposite sides of said well, a bread carriage within said well movable between a toasting position at the lower part of said well and a higher bread-removing position, means for holding said bread carriage in toasting position prior to the toasting operation, means for energizing said heating means, thermostatically controlled means for deenergizing said heating means to terminate the toasting operation, automatic means to thereafter effect movement of said bread carriage to said bread removing position and back to said toasting position, and means engageable with the bread slice upon arrival of said bread carriage at said bread removing position for retaining the bread slice in said bread-removing position.

References Cited in the file of this patent
UNITED STATES PATENTS

| | | |
|---|---|---|
| 1,708,522 | Pross | Apr. 9, 1929 |
| 1,739,155 | Lincoln | Dec. 10, 1929 |
| 1,841,301 | Schroeder et al. | Jan. 12, 1932 |
| 2,194,859 | Malmquist et al. | Mar. 26, 1940 |
| 2,285,231 | Scharf | June 2, 1942 |
| 2,301,070 | Myers | Nov. 3, 1942 |
| 2,319,997 | Ireland | May 25, 1943 |
| 2,361,446 | Anderson | Oct. 31, 1944 |
| 2,426,620 | Koci | Sept. 2, 1947 |
| 2,436,575 | Johnson | Feb. 24, 1948 |
| 2,471,649 | Page | May 31, 1949 |
| 2,616,358 | Stevenson et al. | Nov. 4, 1952 |
| 2,644,392 | Foster | July 7, 1953 |
| 2,734,448 | McCullough | Feb. 14, 1956 |

UNITED STATES PATENT OFFICE
CERTIFICATE OF CORRECTION

Patent No. 2,877,702                                    March 17, 1959

Charles Roger Turner

It is hereby certified that error appears in the printed specification of the above numbered patent requiring correction and that the said Letters Patent should read as corrected below.

Column 8, line 53, after "bread-removing position." insert the following as claim 14:

14. In an automatic bread toaster having at least one bread-receiving well, electric heating means disposed on opposite sides of said well, bread carriage means within said well movable between a toasting position at the lower part of said well and a higher bread-removing position, operating mechanism for said carriage means, spring means connected to said mechanism to urge said carriage means upward toward said bread-removing position, normally-deenergized current-operable means for exerting through said mechanism a downward force on said carriage means greater than the force of said spring means and adapted when energized to relax the downward force, means operable by a bread slice inserted in said well to energize said heating means and thus initiate a toasting operation, means operable at the end of the toasting operation to deenergize said heating means and to energize said current-operable means, whereby the latter permits movement of said carriage means by said spring means to said bread-removing position, means for retaining the bread slice in said bread-removing position, and means operable by said mechanism for deenergizing said current-operable means to cause return movement of said carriage means thereby to said toasting position.

in the heading to the printed specification, line 7, for "13 Claims." read -- 14 Claims. --.

Signed and sealed this 4th day of August 1959.

(SEAL)
Attest:

KARL H. AXLINE                                                ROBERT C. WATSON
Attesting Officer                                            Commissioner of Patents